(12) United States Patent
Rodriguez et al.

(10) Patent No.: US 11,203,310 B2
(45) Date of Patent: Dec. 21, 2021

(54) ELECTRICAL TERMINAL STABILIZER

(71) Applicant: Aptiv Technologies Limited, St. Michael (BB)

(72) Inventors: Erick A. Rodriguez, Juarez (MX); Naiki A. Reynoso Galvan, Rochester, MI (US); Katy Stephanie Almonte Cortes, Rochester, MI (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/722,681

(22) Filed: Dec. 20, 2019

(65) Prior Publication Data

US 2021/0188202 A1    Jun. 24, 2021

(51) Int. Cl.
| | |
|---|---|
| *H01R 13/453* | (2006.01) |
| *B60R 16/023* | (2006.01) |
| *H01R 12/70* | (2011.01) |
| *H01R 13/42* | (2006.01) |
| *H01R 13/502* | (2006.01) |

(Continued)

(52) U.S. Cl.
CPC ......... *B60R 16/0238* (2013.01); *H01R 12/70* (2013.01); *H01R 13/42* (2013.01); *H01R 13/4538* (2013.01); *H01R 13/502* (2013.01); *H01R 13/627* (2013.01); *H01R 13/6658* (2013.01)

(58) Field of Classification Search
None
See application file for complete search history.

(56) References Cited

U.S. PATENT DOCUMENTS

| | | | | | |
|---|---|---|---|---|---|
| 5,466,164 | A | * | 11/1995 | Miyazaki | ........... H01R 13/4538 439/140 |
| 6,422,881 | B1 | * | 7/2002 | Puhl | ................... H01R 13/4538 439/140 |

(Continued)

FOREIGN PATENT DOCUMENTS

| | | |
|---|---|---|
| EP | 2819248 A1 | 12/2014 |
| EP | 2321878 B1 | 6/2015 |

(Continued)

OTHER PUBLICATIONS

European Search Report for European Application No. 20212405.3 dated Apr. 23, 2021.

*Primary Examiner* — Felix O Figueroa
(74) *Attorney, Agent, or Firm* — Carlson, Gaskey & Olds, P.C.

(57) ABSTRACT

An electrical connector assembly includes an electrical terminal that is mounted to a support structure. The assembly also includes a stabilizer that has a slot that receives a free end of the electrical terminal. The assembly further includes a first spring that operatively supports the stabilizer relative to support structure. The first spring biases the stabilizer away from the support structure to a pre-staged position. The first spring is configured to flex from the pre-staged position to an assembled connector position in which more of the free end protrudes through the slot than in the pre-staged position. The first spring extends from each of opposing sides of a first post which is arranged at a first lateral edge of the stabilizer. A second post and a second spring are arranged at a second lateral edge of the stabilizer opposite the first lateral edge.

14 Claims, 7 Drawing Sheets

(51) Int. Cl.
*H01R 13/627* (2006.01)
*H01R 13/66* (2006.01)

(56) References Cited

U.S. PATENT DOCUMENTS

| | | |
|---|---|---|
| 6,761,568 B2 | 7/2004 | Bakker et al. |
| 6,846,191 B2 | 1/2005 | Hobbs et al. |
| 7,179,136 B1 | 2/2007 | Morello |
| 7,578,709 B2 | 8/2009 | Daudin et al. |
| 7,670,177 B2 * | 3/2010 | Myer ................ H01R 13/4538 |
| | | 439/595 |
| 8,038,455 B1 | 10/2011 | Moraes et al. |
| 8,267,702 B2 | 9/2012 | De La Reza et al. |
| 8,926,344 B2 | 1/2015 | Jozwiak et al. |
| 9,054,454 B2 | 6/2015 | Gomez et al. |
| 10,236,629 B2 * | 3/2019 | Narro ................... H01R 13/629 |
| 2011/0294311 A1 | 12/2011 | De La Reza et al. |

FOREIGN PATENT DOCUMENTS

| | | |
|---|---|---|
| EP | 3399597 A2 | 11/2018 |
| JP | H07282895 A | 10/1995 |

\* cited by examiner

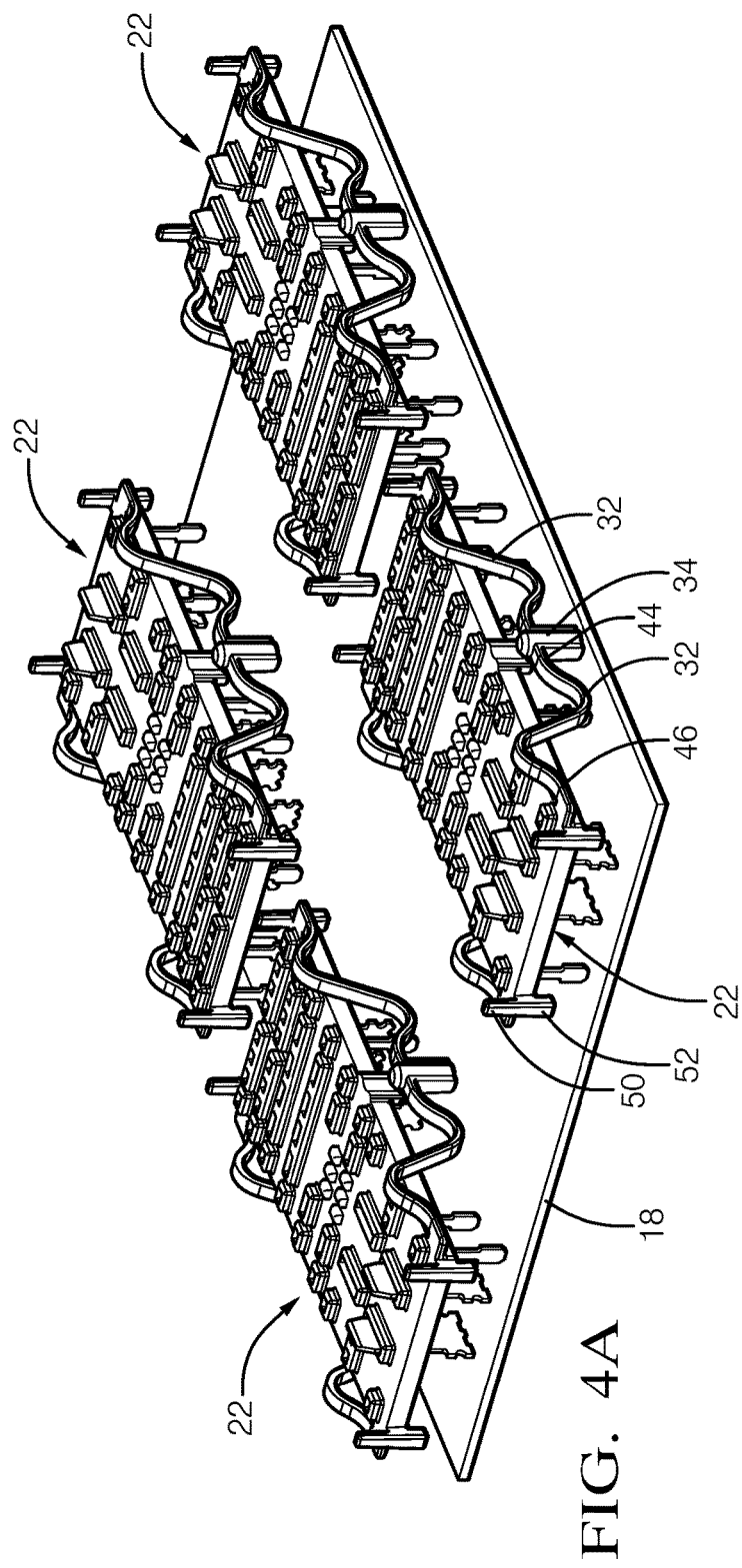
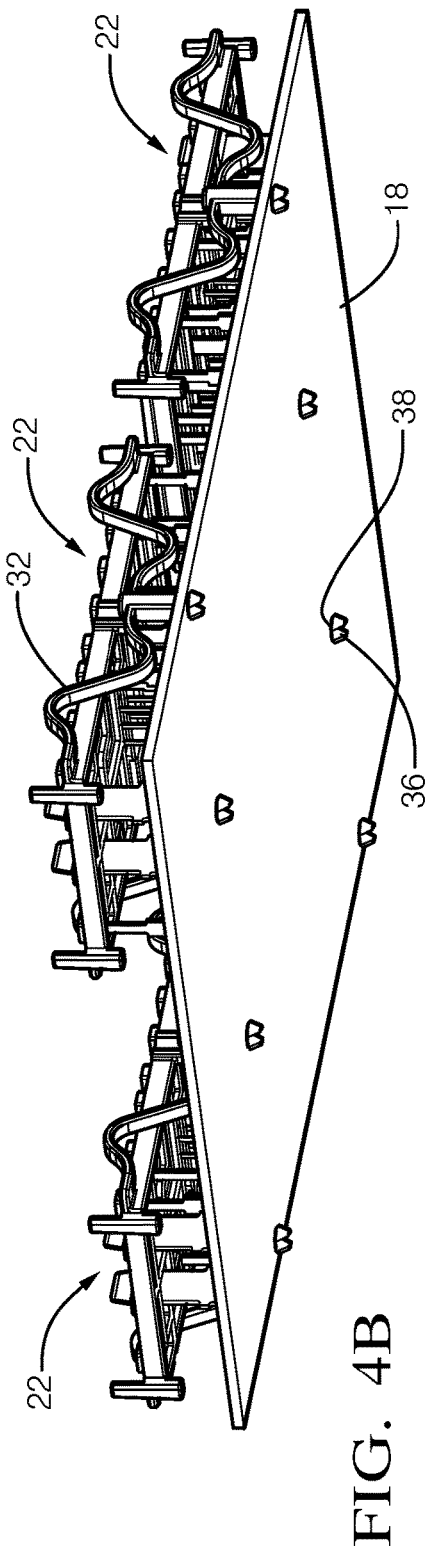
FIG. 4A
FIG. 4B

ELECTRICAL TERMINAL STABILIZER

FIELD OF INVENTION

This disclosure relates to a stabilizer for electrical terminals of an electrical connector assembly.

BACKGROUND

Electrical stabilizers are used to stabilize free ends of electrical terminals as those terminals receive complimentarily-shaped terminals of another mating electrical connector. The stabilizer is provided in a pre-staged position in which the free ends of the terminals are received in slots of the stabilizer.

In one example configuration, the stabilizer is supported in the pre-staged position by the surrounding housing of the electrical connector assembly. A mating connector is used to push the stabilizer against a lower housing floor, which exposes the free ends to the mating connector such that the terminals make an electrical connection.

One problem with prior art arrangements is that the stabilizer does not return to its pre-staged position once the electrical connector is removed from the electrical connector assembly. The stabilizer also may not move evenly from the pre-staged position to the assembled connector position, which causes the stabilizer to bind and become stuck within the housing. As a result, a subsequent attempt to connect the electrical terminals may result in the terminals being knocked out of position.

SUMMARY

In one exemplary embodiment, an electrical connector assembly includes an electrical terminal that is mounted to a support structure. The assembly also includes a stabilizer that has a slot that receives a free end of the electrical terminal. The assembly further includes a first spring that operatively supports the stabilizer relative to support structure. The first spring biases the stabilizer away from the support structure to a pre-staged position. The first spring is configured to flex from the pre-staged position to an assembled connector position in which more of the free end protrudes through the slot than in the pre-staged position. The first spring extends from each of opposing sides of a first post which is arranged at a first lateral edge of the stabilizer. A second post and a second spring are arranged at a second lateral edge of the stabilizer opposite the first lateral edge.

In a further embodiment of any the above, the first and second posts are secured to the support structure.

In a further embodiment of any the above, the first and second posts each have a barb that is received in a hole in the support structure in a snap-fit relationship.

In a further embodiment of any the above, the first and second springs are S-shaped and each include a first end that is secured to its respective post and a second end that is secured to the stabilizer. The first and second springs each include a trough that extends from the first end to a peak that extends to the second end.

In a further embodiment of any the above, the first and second springs are integral with the stabilizer.

In a further embodiment of any the above, the first and second lateral edges of the stabilizer are spaced apart from one another. The first and second springs are spaced apart from the first and second lateral edges. The first and second springs are movable in a plane that is normal to the stabilizer.

In a further embodiment of any the above, the support structure is a printed circuit board. The electrical terminal is a male terminal.

In a further embodiment of any the above, the assembly includes a housing. The printed circuit board is arranged within the housing.

In a further embodiment of any the above, the housing includes first and second housing portions. The first housing portion includes a window that exposes the stabilizer and the male terminal. The first housing portion has a contour that corresponds to a spring contour of the first and second springs in the pre-staged position.

In a further embodiment of any the above, the stabilizer has a stop that extends toward the printed circuit board. The stop is spaced a distance from the printed circuit board equal to a distance between the stabilizer and the printed circuit board in the pre-staged position. The stop is configured to limit movement of the stabilizer to the assembled connector position.

In a further embodiment of any the above, the first and second posts are secured to the support structure. The first and second springs are S-shaped and include a first end secured to its respective post and a second end secured to the stabilizer. The first and second springs include a trough that extends from the first end to a peak that extends to the second end. The support structure is a printed circuit board. The electrical terminal is a male terminal. The assembly further includes a housing that includes first and second housing portions. The printed circuit board is arranged within the housing. The first housing portion includes a window that exposes the stabilizer and the male terminal.

In another exemplary embodiment, a method of assembling an electrical connector assembly includes a stabilizer that is secured to a printed circuit board with spring elements intermediate the stabilizer and the printed circuit board. The stabilizer has a wall that includes a slot that receives a free end of an electrical terminal. The wall is provided in a pre-staged position relative to the printed circuit board by the spring elements. The method further includes the printed circuit board and stabilizer that are mounted within a housing.

In a further embodiment of any the above, the method includes a step of engaging the wall with a connector. The connector has another terminal that is aligned with the electrical terminal and includes a step of pushing the stabilizer from a pre-staged position with the connector to overcome a force generated by the spring elements and electrically couple the electrical terminal and the another terminal by moving the stabilizer to an assembled connector position.

In a further embodiment of any the above, the method includes a step of pulling the connector to decouple the electrical terminal and the other terminal. The method further includes a step of returning the stabilizer to the pre-staged position via the force generated by the spring elements.

In a further embodiment of any the above, the method includes a step of limiting the return of the stabilizer to the pre-staged position by abutting the spring elements against a contour of a first housing portion.

In a further embodiment of any the above, the method includes a step of limiting movement of the stabilizer to the assembled connector position with a stop that extends toward the printed circuit board. The stop is spaced a distance from the printed circuit board equal to a distance between the stabilizer and the printed circuit board in the pre-staged position.

In a further embodiment of any the above, one of the spring elements extends from each of the opposing sides of a post which is arranged at one lateral edge of the stabilizer. Another post and another spring element is arranged at another lateral edge of the stabilizer opposite the one lateral edge. The securing step includes a barb inserted on each of the posts into corresponding holes in the printed circuit board in a snap-fit relationship.

In another exemplary embodiment, an electrical connector assembly includes an electrical terminal that is mounted to a support structure. A stabilizer has a slot that receives a free end of the electrical terminal. A spring operatively supports the stabilizer relative to support structure. The spring biases the stabilizer away from the support structure to a pre-staged position. The spring is configured to flex from the pre-staged position to an assembled connector position in which more of the free end protrudes through the slot than in the pre-staged position.

BRIEF DESCRIPTION OF THE DRAWINGS

The disclosure can be further understood by reference to the following detailed description when considered in connection with the accompanying drawings wherein:

FIG. 4A is a first perspective view of a printed circuit board with multiple stabilizers mounted thereto and arranged in the pre-staged position.

FIG. 4B is a second perspective view of the arrangement shown in FIG. 4A.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
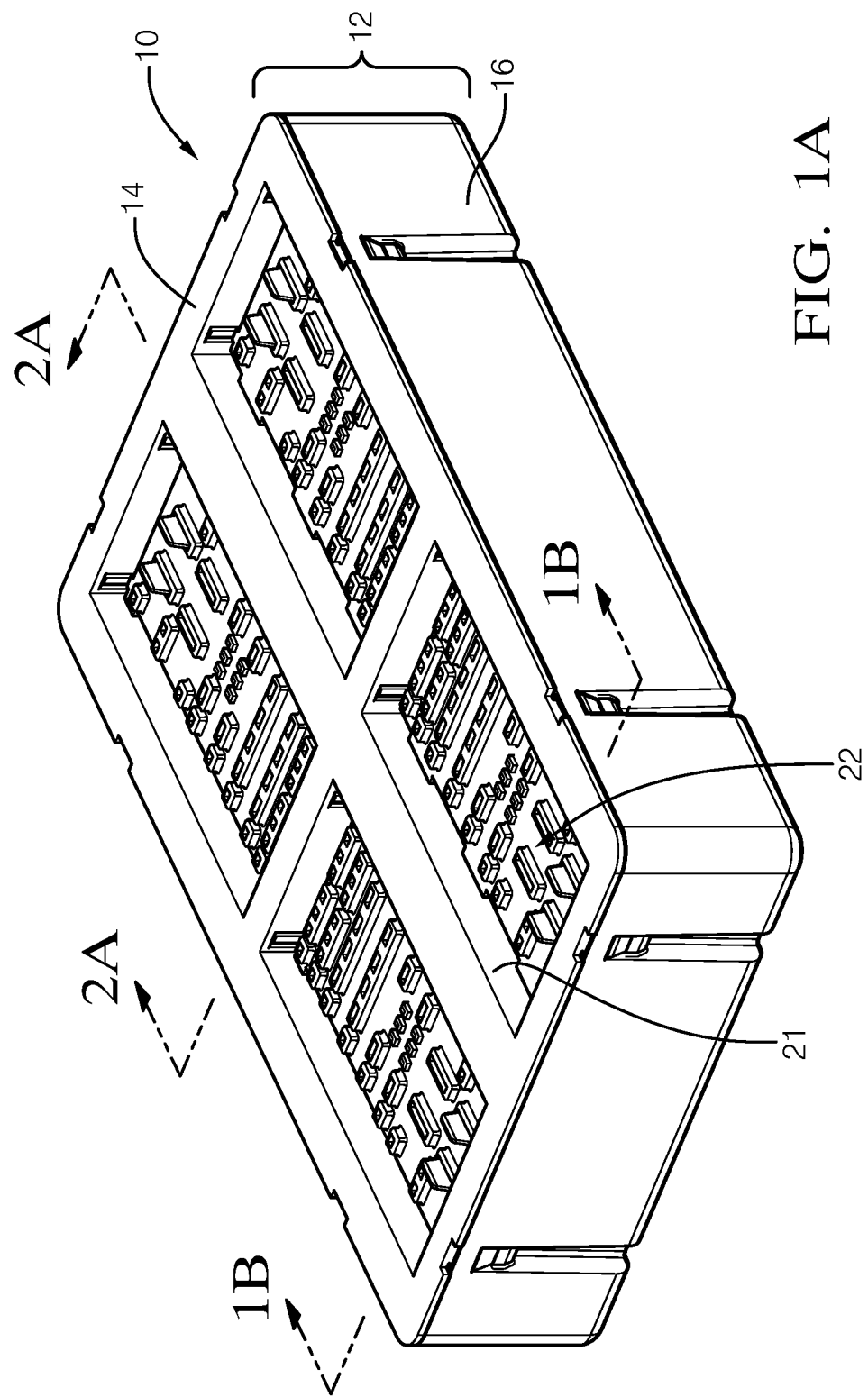
FIG. 1A is a perspective view of an example electrical connector assembly with the disclosed stabilizer.
Figure 1B:
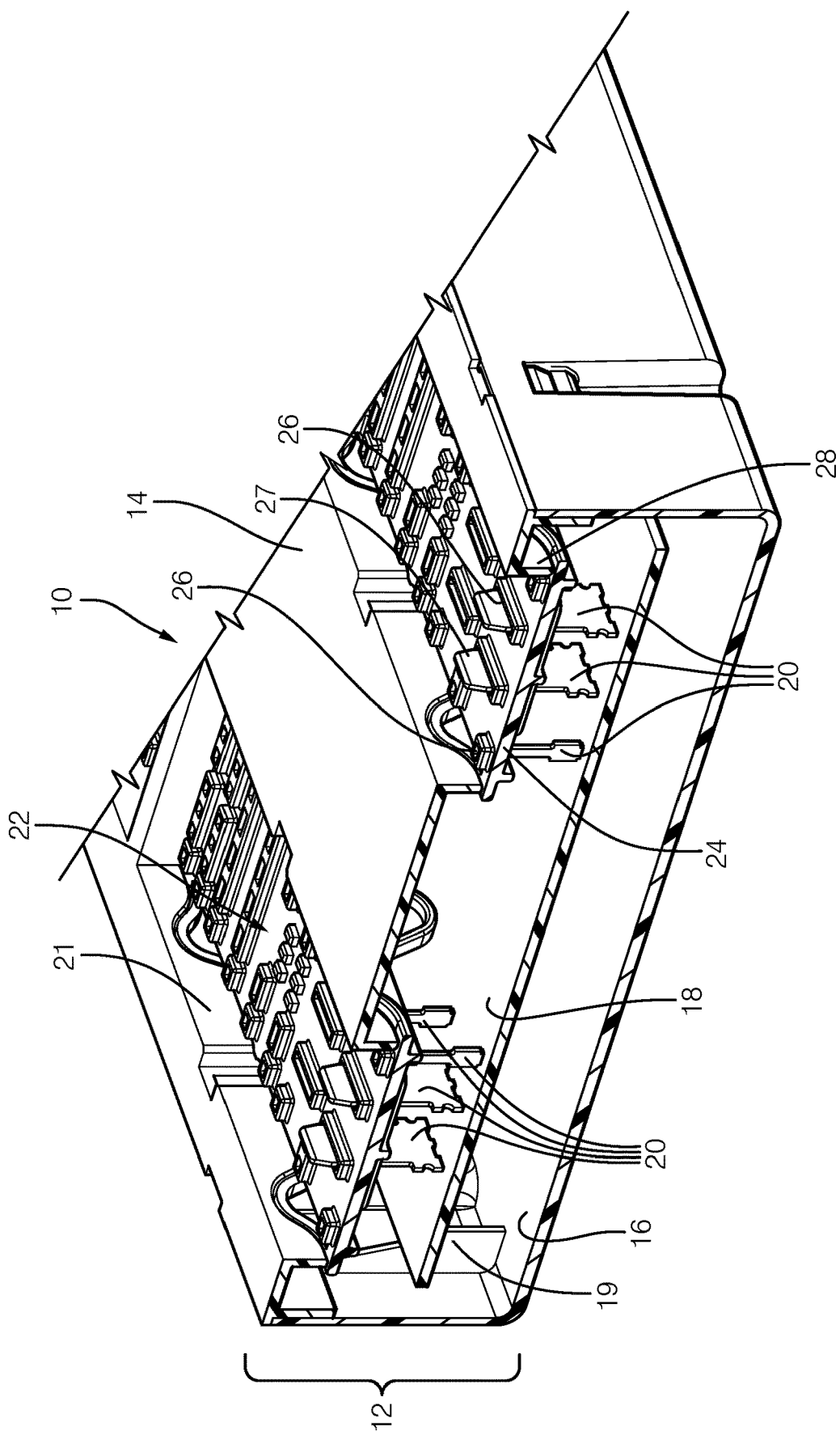
FIG. 1B is a cross-sectional view through the assembly taken along line 1B-1B in FIG. 1A.

An electrical connector assembly 10 is illustrated in FIGS. 1A and 1B. The assembly 10 is exemplary of one configuration, although other configurations may be used with the disclosed stabilizer. The electrical connector assembly 10 may be a component of an electrical distribution center as shown in FIGS. 1A and 1B or in other embodiments may be a standalone electrical connector assembly. The assembly 10 includes a housing 12 having first and second housing portions 14, 16 secured to one another. A first housing portion 14 has multiple windows 21 configured to each receive one or more electrical connectors (not shown). A printed circuit board (PCB) 18 is arranged within the housing 12 and is retained by the second housing portion 16 by supports 19. Multiple terminals 20, typically male terminals, extend from the PCB 18 for connection with electrical connectors that are in electrical communication with various components distributed throughout the vehicle.

In the example, a stabilizer 22 is provided within each window 21. Each stabilizer 22 includes a wall 24 having slots 26 each circumscribed by a protrusion 28, for example. A free end 27 of each terminal 20 is received within a corresponding slot 26. The free end 27 may be contained within the slot 26 or extend partially from the slot 26. The stabilizer 22 provides support to the terminals 20 such that they do not become inadvertently bent during handling or misaligned with respect to the mating electrical connectors during the assembly process.

Figure 2A:
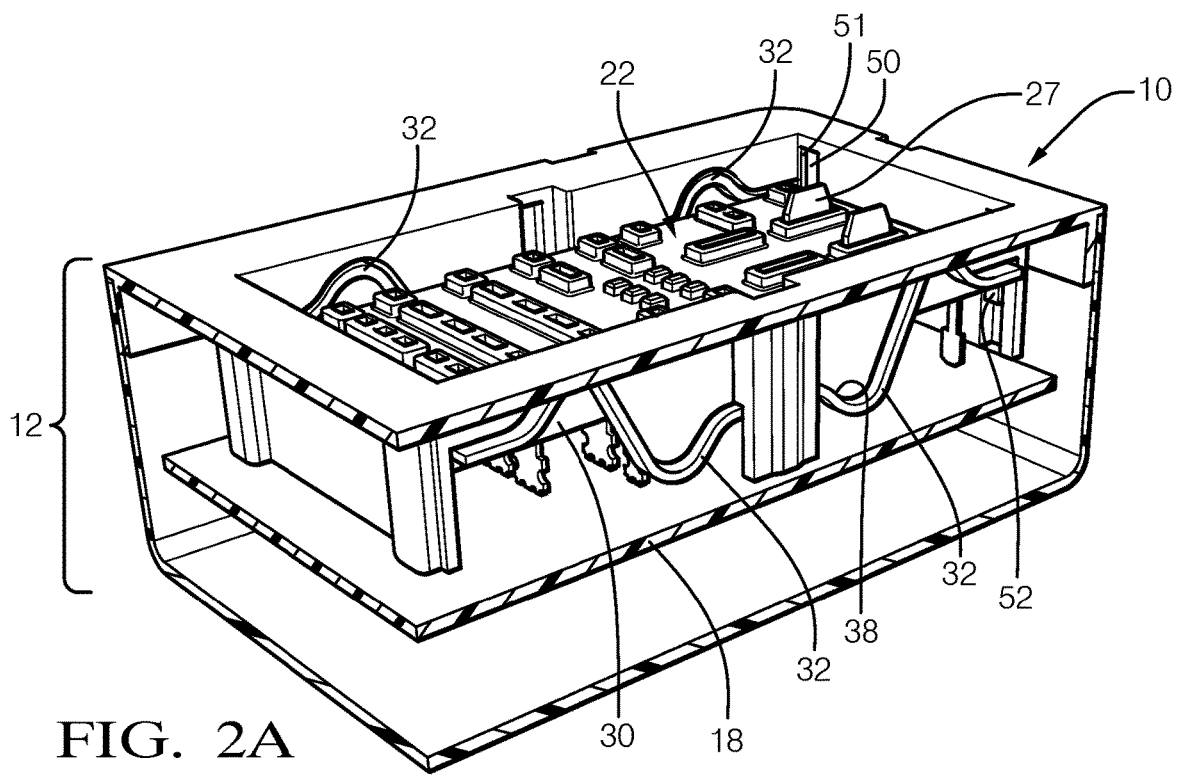
FIG. 2A is a cross-sectional view taken along line 2A-2A in FIG. 1A with the stabilizer in the pre-staged position.
Figure 2B:
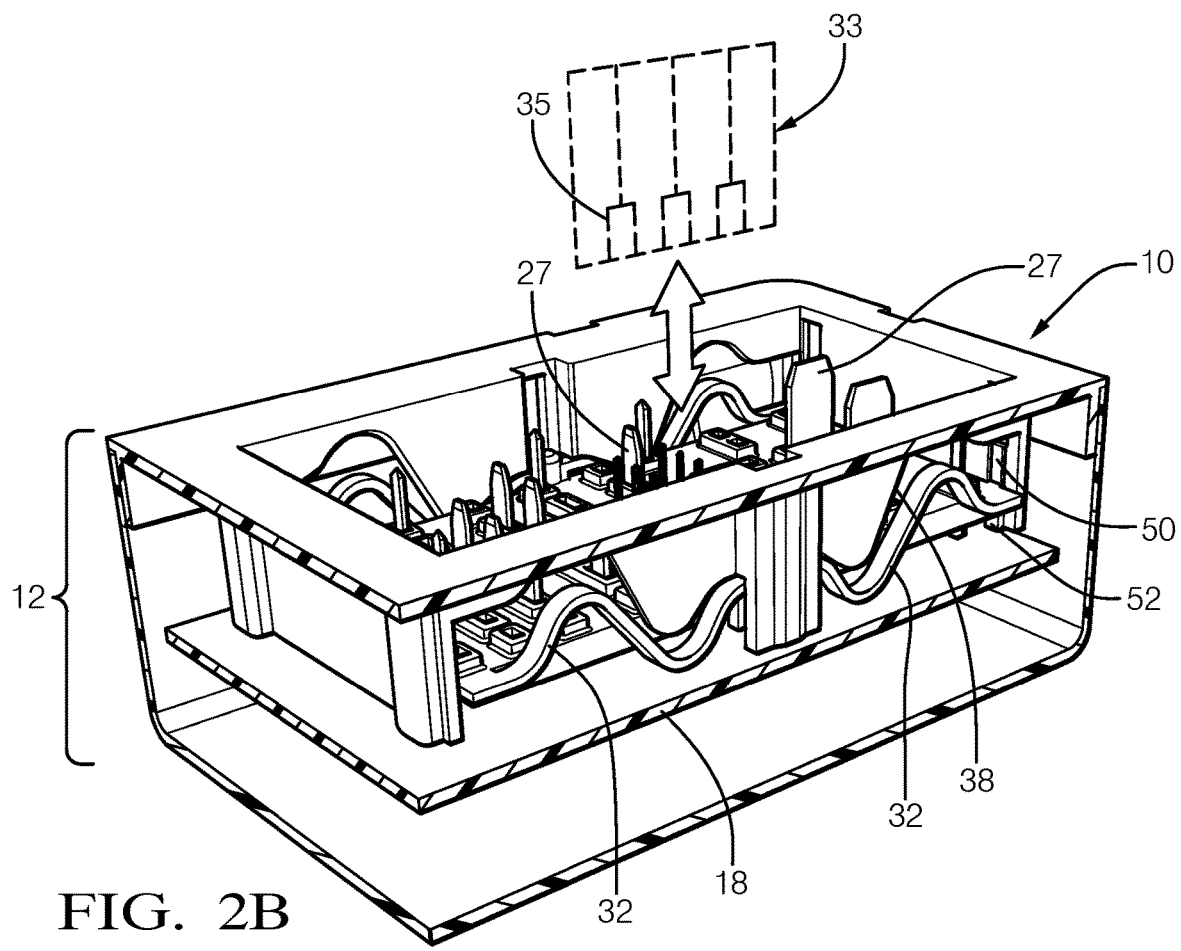
FIG. 2B is a similar view to that of FIG. 2A, but with the stabilizer in an assembled connector position.

FIG. 2A illustrates the stabilizer at 22 in a pre-staged condition prior to installation of a mating connector and subsequent to removal of that mating connector. FIG. 2B illustrates an assembled connector position in which the stabilizer 22 has been moved toward the PCB 18 in response to pushing another electrical connector 33 into engagement with the stabilizer 22 to electrically connect the terminals 20 with terminals 35.

Figure 3:
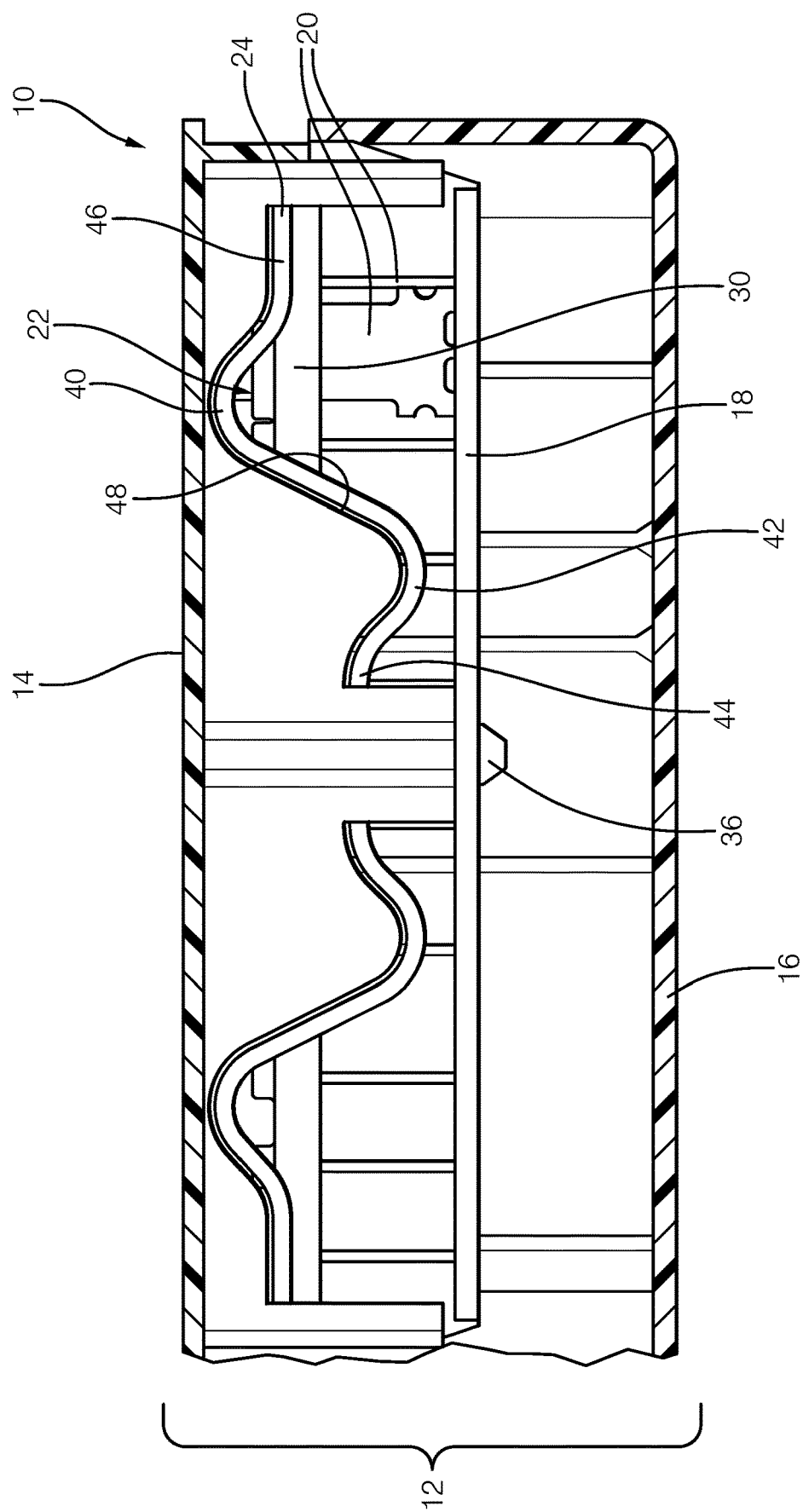
FIG. 3 is a side elevational view of the assembly and stabilizer as shown in the sectional view of FIG. 2A.
Figure 5:
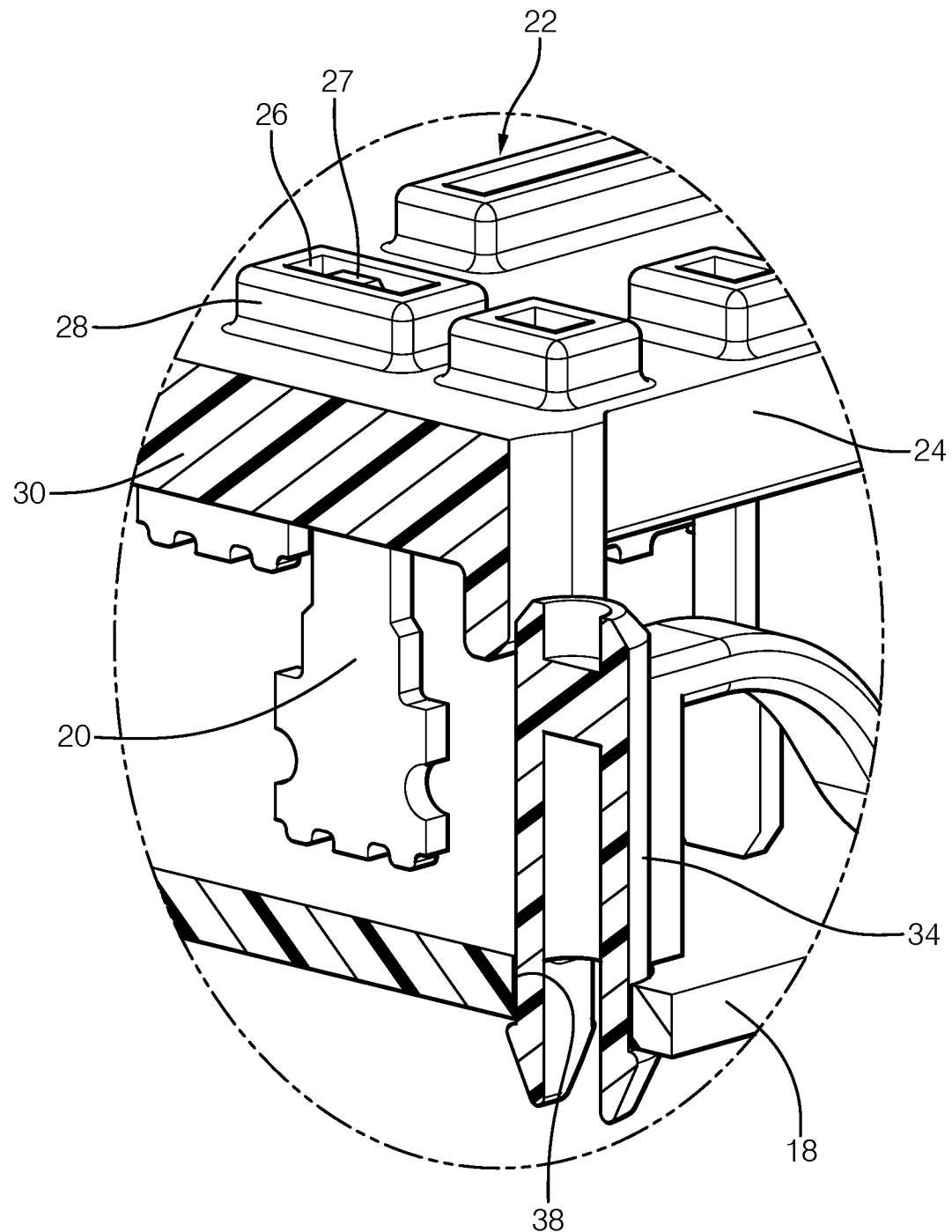
FIG. 5 is an enlarged cross-sectional view through a post of the stabilizer that is secured to the printed circuit board.
Figure 6A:
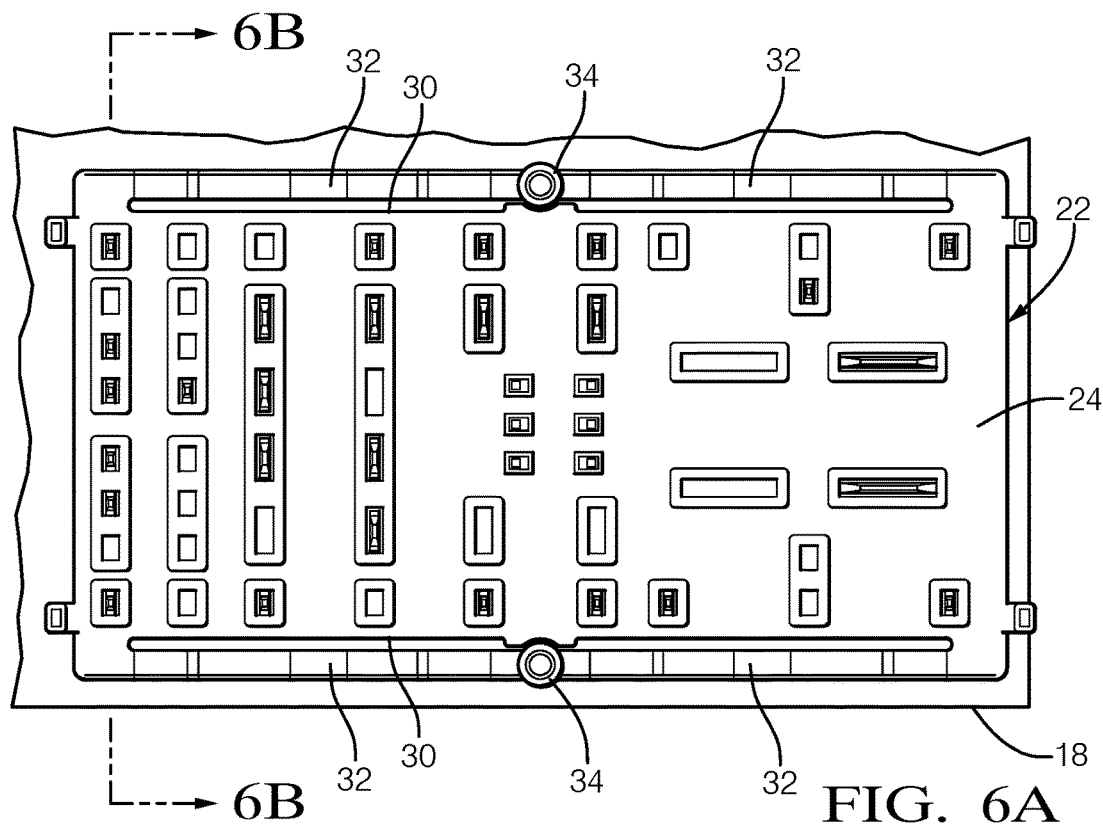
FIG. 6A is a top view of the stabilizer mounted to the printed circuit board by the posts and suspended in the pre-staged position by the springs.
Figure 6B:
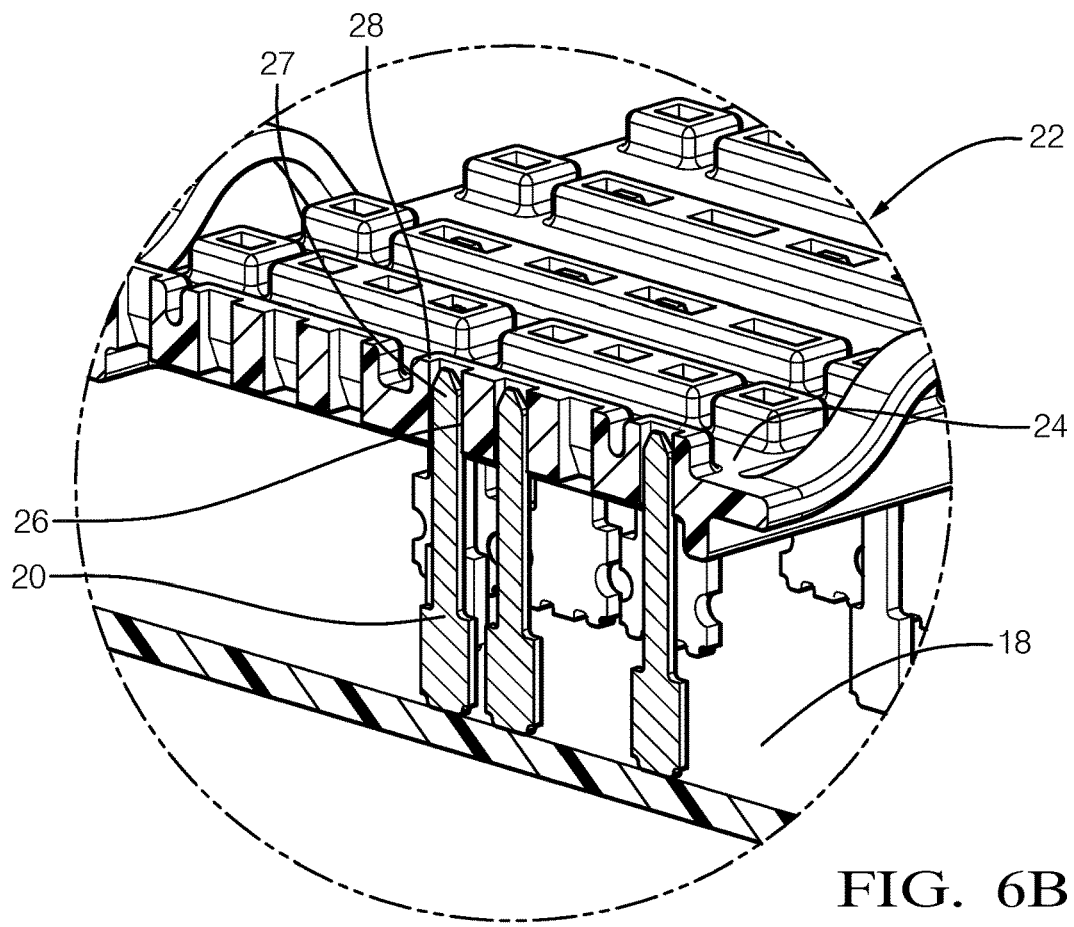
FIG. 6B is a cross-sectional view through the stabilizer illustrating free ends of the terminals within slots in the stabilizer.

Referring to FIGS. 2A-3 and 6A, the wall 24 of the stabilizer 22 has spaced apart lateral edges 30 (best shown in FIG. 6A). Multiple springs 32 are configured to bias the stabilizer 22 away from the PCB 18 to the pre-staged position illustrated in FIG. 2A. In one example, a post 34 next to each lateral edge 30 is secured to the PCB 18. In the example, each post has a barb 36 received in a hole 38 (FIG. 5) in the PCB, which is best illustrated in FIGS. 3 and 4B.

One of the springs 32 extends from each of opposing sides of the post 34 such that a pair of springs 32 is used to support each lateral edge 30 with respect to its corresponding post 34, as best shown in FIG. 4A. The springs 32 are S-shaped, i.e. having a serpentine or sinusoidal shape. Each spring 32 includes a first end 44 secured to its respective post 34 and a second end 46 secured to its respective lateral edge 30. The spring 32 includes a trough 42 extending from the first end 44 to a peak 40 that extends to the second end 46. The housing portion 14 includes a contour 48 that corresponds to the S-shape when the stabilizer 22 is in the pre-staged condition, as shown in FIG. 3. This contour 48 maintains desired alignment and positioning of the stabilizer 22 with respect to the housing 12 via the springs 32.

Referring to FIGS. 2A, 2B, and 4A, the wall 24 supports upper and lower stops 50, 52 at each corner. The upper stop 50 is in close proximity to or in contact with an inner surface of the first housing 14 when the stabilizer 22 is in the pre-staged condition, as shown in FIG. 2A. Each upper stop 50 may be slideably received in a slot 51 in the first housing 14 to provide further stability to the stabilizer 22 during movement within the housing 12. The lower stop 52 is spaced from the PCB 18 in the pre-staged condition, but come in close proximity to or contact with the PCB 18 when the stabilizer is moved to the assembled connector position shown in FIG. 2B. In this manner, the upper and lower stops 50, 52 limit the range of motion of the stabilizer 22 respectively to the pre-staged position and the assembled connector position.

In operation, the electrical connector assembly is assembled by securing the stabilizer 22 to the printed circuit board 18 by the springs 32. The stabilizer 22 has a wall 24 that includes a slot 26 that receives a free end 27 of an electrical terminal 20 (typically a male terminal). The wall is provided in the pre-staged position relative to the PCB 18 by the springs 32. The PCB 18 and the stabilizer 22 are mounted within the housing 12. A connector 33 engages the wall 24 such that another terminal 35 (typically a female terminal) is aligned with the electrical terminal 20. The stabilizer 22 is pushed with the connector 33 to overcome the springs 32 and electrically couple the electrical terminal 20 and the other terminal 35 in the assembled connector position.

The connector 33 may be removed by pulling the connector to decouple the electrical terminal 20 and the other terminal 35, which returns the stabilizer 22 to the pre-staged position using the springs 32. The return of the stabilizer 22 to the pre-staged position may be limited by abutting the springs 32 to the contour 48 of the first housing 14 and/or contacting the interface of the first housing 14 with the upper stop 50. Movement of the stabilizer 22 to the assembled connector position may be limited by the lower stop 52 contacting the PCB 18.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An electrical connector assembly comprising:
   an electrical terminal mounted to a support structure;
   a stabilizer having a slot receiving a free end of the electrical terminal;
   a housing includes a window exposing the stabilizer, wherein the support structure is arranged within the housing;
   a first spring operatively supporting the stabilizer relative to support structure, the first spring biasing the stabilizer away from the support structure to a pre-staged position, the first spring configured to flex from the pre-staged position to an assembled connector position in which more of the free end protrudes through the slot than in the pre-staged position, wherein the first spring extends from each of opposing sides of a first post which is arranged at a first lateral edge of the stabilizer, and a second post and a second spring are arranged at a second lateral edge of the stabilizer opposite the first lateral edge;
   wherein the housing includes first and second housing portions, and the first housing portion includes a window exposing the stabilizer and the electrical terminal, the first housing portion has a contour that corresponds to a spring contour of the spring in the pre-staged position, the contour configured to limit the return of the stabilizer to the pre-staged position by abutting the spring against the contour;
   wherein the stabilizer includes an upper stop in close proximity to or in contact with an inner surface of the housing when the stabilizer is in the pre-staged condition;
   wherein the stabilizer has a lower stop extending toward the support structure, wherein the lower stop is spaced a distance from the support structure equal to a distance between the stabilizer and the support structure in the pre-staged position, the lower stop configured to limit movement of the stabilizer to the assembled connector position; and
   wherein the upper and lower stops are arranged on opposite sides of the stabilizer and extend in opposite directions from one another.

2. The assembly of claim 1, wherein the first and second posts are secured to the support structure.

3. The assembly of claim 2, wherein the first and second posts each have a barb that is received in a hole in the support structure in a snap-fit relationship.

4. The assembly of claim 1, wherein the first and second springs are S-shaped and each include a first end secured to its respective post and a second end secured to the stabilizer, the first and second springs each include a trough extending from the first end to a peak that extends to the second end.

5. The assembly of claim 1, wherein the first and second springs are integral with the stabilizer.

6. The assembly of claim 5, wherein the first and second lateral edges of the stabilizer are spaced apart from one another, wherein the first and second springs are spaced apart from the first and second lateral edges, and wherein the first and second springs are movable in a plane that is normal to the stabilizer.

7. The assembly of claim 1, wherein the support structure is a printed circuit board, and the electrical terminal is a male terminal.

8. The assembly of claim 1, wherein the first and second posts are secured to the support structure, wherein the first and second springs are S-shaped, each including first end secured to its respective post and a second end secured to the stabilizer, the first and second springs include a trough extending from the first end to a peak that extends to the second end, the support structure is a printed circuit board, and the electrical terminal is a male terminal, portions, wherein the printed circuit board is arranged within the housing.

9. A method of assembling an electrical connector assembly, comprising:
   securing a stabilizer to a printed circuit board with spring elements intermediate the stabilizer and the printed circuit board, wherein the stabilizer has a wall including a slot that receives a free end of an electrical terminal, and wherein the wall is provided in a pre-staged position relative to the printed circuit board by the spring elements;
   mounting the printed circuit board and stabilizer within a housing;
   returning the stabilizer to the pre-staged position via the force generated by the spring elements; and
   limiting the return of the stabilizer to the pre-staged position by abutting the spring elements against a contour of a first housing portion.

10. The method of claim 9, comprising a step of engaging the wall with a connector, wherein the connector has another terminal aligned with the electrical terminal, and comprising a step of pushing the stabilizer from the pre-staged position with the connector to overcome a force generated by the spring elements and electrically couple the electrical terminal and the another terminal by moving the stabilizer to an assembled connector position.

11. The method of claim 10, comprising a step of pulling the connector to decouple the electrical terminal and the other terminal.

12. The method of claim 10, comprising a step of limiting movement of the stabilizer to the assembled connector position with a stop extending toward the printed circuit board, wherein the stop is spaced a distance from the printed circuit board equal to a distance between the stabilizer and the printed circuit board in the pre-staged position.

13. The method of claim 9, wherein one of the spring elements extends from each of opposing sides of a post which is arranged at one lateral edge of the stabilizer, and another post and another spring element is arranged at another lateral edge of the stabilizer opposite the one lateral edge, wherein the securing step includes inserting a barb on each of the posts into corresponding holes in the printed circuit board in a snap-fit relationship.

14. An electrical connector assembly, comprising:
an electrical terminal mounted to a support structure;
a stabilizer having a slot receiving a free end of the electrical terminal; and
a spring operatively supporting the stabilizer relative to support structure, the spring biasing the stabilizer away from the support structure to a pre-staged position, the spring configured to flex from the pre-staged position to an assembled connector position in which more of the free end protrudes through the slot than in the pre-staged position; and
a housing, wherein the support structure is arranged within the housing, wherein the housing includes first and second housing portions, and the first housing portion includes a window exposing the stabilizer and the electrical terminal, the first housing portion has a contour that corresponds to a spring contour of the spring in the pre-staged position, the contour configured to limit the return of the stabilizer to the pre-staged position by abutting the spring against the contour.

\* \* \* \* \*